H. Dunham, Jr.
Sewing Machine.
No. 1363 Fig. 1. Reissued Dec. 16, 1862.
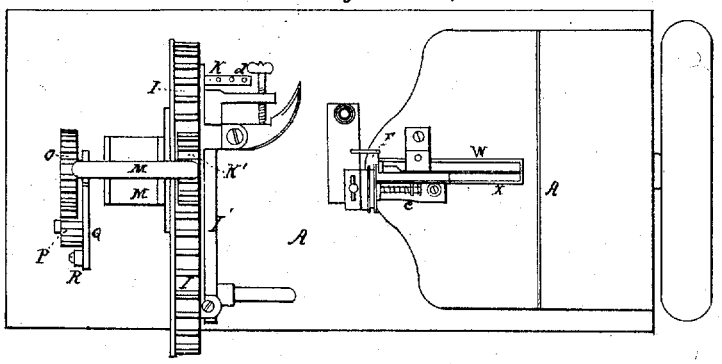
Fig. 2.
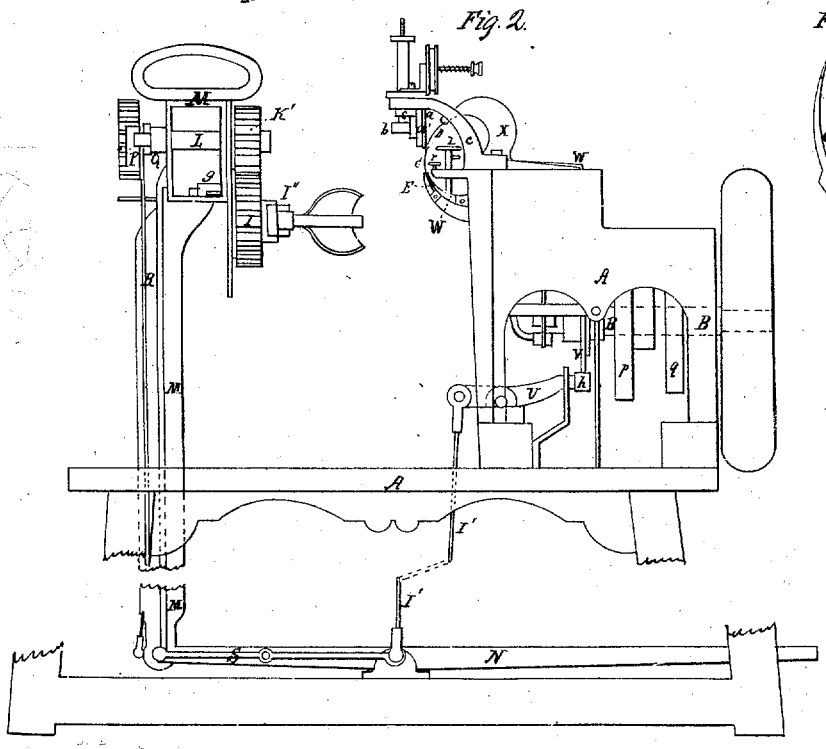
Fig. 7.
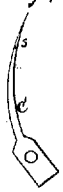
Fig. 6.
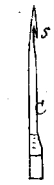
Witnesses.
A. P. Hale Jr.
J. R. Bampton
Inventor.
Henry Dunham Jr. by his attorney R. H. Eddy Sheet 2—3 Sheets.

H. Dunham, Jr.

Sewing Machine.

No. 1363 Reissued Dec. 16, 1862.

Witnesses.

A. P. Hale Jr

J. R. Bampton

Inventor.

Henry Dunham Jr by his attorney

R. H. Eddy

Sheet 3 - 3 Sheets.

H. Dunham, Jr.

Sewing Machine.

No. 1363 Reissued Dec. 16, 1862.

Witnesses.
H. P. Hubbard Jr
J. R. Bannister

Inventor.
Henry Dunham Jr
by his attorney
H. K. Eng

UNITED STATES PATENT OFFICE.

HENRY DUNHAM, JR., OF ABINGTON, MASSACHUSETTS.

IMPROVEMENT IN MACHINES FOR SEWING SOLES TO BOOTS AND SHOES.

Specification forming part of Letters Patent No. 36,396, dated September 9, 1862; Reissue No. 1,363, dated December 16, 1862.

*To all whom it may concern:*

Be it known that I, HENRY DUNHAM, Jr., a citizen of the United States of America, and a resident of Abington, in the county of Plymouth and State of Massachusetts, have made an invention of a new and useful Machine for Sewing the Sole to the Upper-Leather of a Boot or Shoe; and I do hereby declare the same to be fully described in the following specification and represented in the accompanying drawings, of which—

Figure 3:
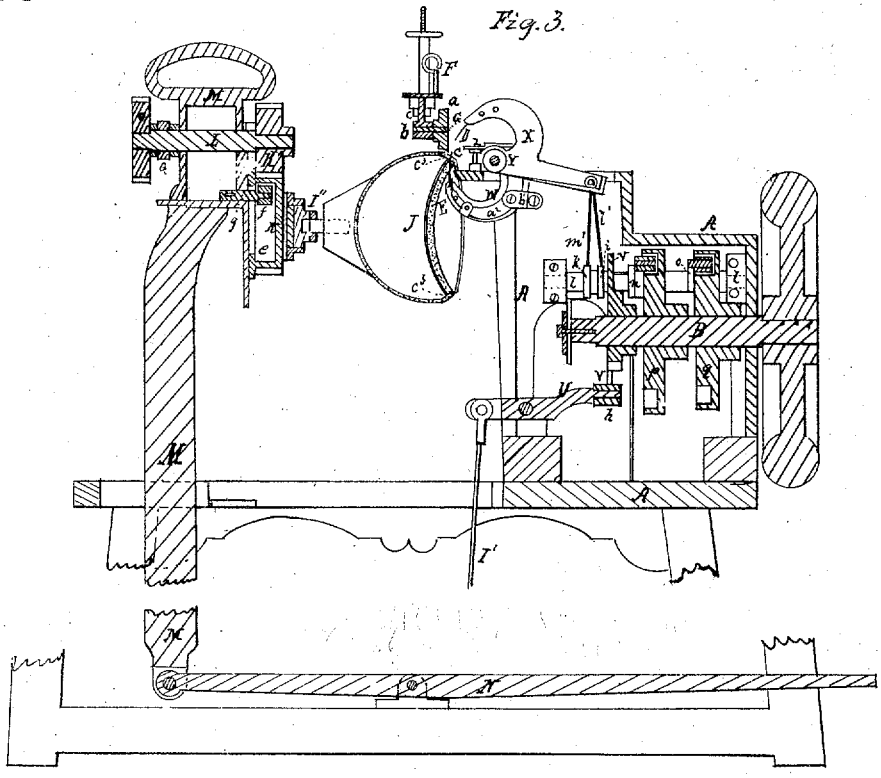
Figure 5:
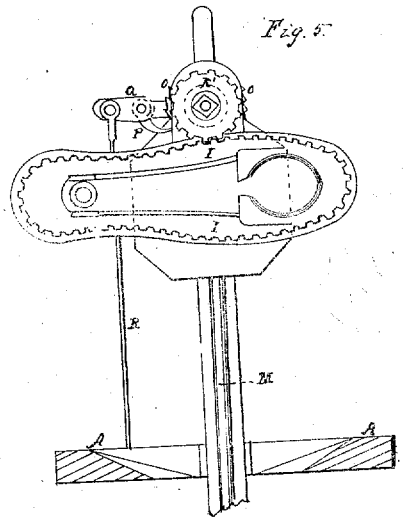
Figure 4:
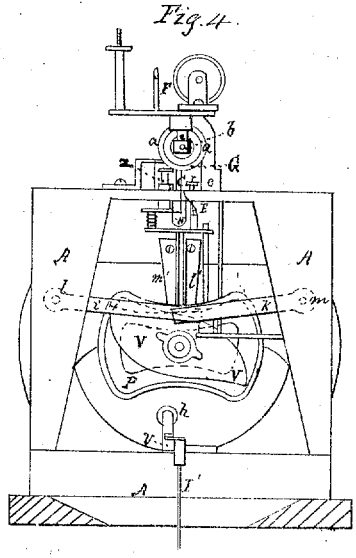

Figure 1 is a top view, and Fig. 2 a front elevation, of my said machine. Fig. 3 is a longitudinal section of it. Figs. 4 and 5 are vertical and transverse sections of it, taken through its middle, one exhibiting the parts to the right and the other those to the left of the plane of section.

The nature of my invention or improvements consists as follows, viz: of a combination of a curved hook-needle and the last as made with a concave bottom, in order that the needle may work through the upper-leather and the sole at or near their adjacent edges; also, in a peculiar arrangement of the hook with reference to the curve of the shank of the needle; also, in the combination of an awl curved longitudinally with a needle having its shank curved longitudinally and provided with a hook near its point; also, in a sewing-machine as constructed not only with its needle curved and hooked, but with the same and the rest cast-off and needle-closer made to operate in curved paths having a common center or axis; also, in the combination of the curved and hooked needle with the last constructed with a concave bottom and with a chamfer, or with equivalents, so as to form a ridge on the last, as hereinafter described; also, in the combination of the last-holder with its carrying-plate in such manner as to enable the former to be inclined or adjusted with respect to the latter, as may be necessary from time to time to vary the position of the last in order to maintain the plane of the guide-wheel flange tangential to the curve of the bottom of the last; also, in an arrangement of the feeding mechanism with respect to the last-carrying plate-supporter and the sewing mechanism; also, in a curved awl and a curved hook-needle, arranged and combined with a guide-wheel, and a last provided with a concave bottom, the whole being in manner and so as to operate substantially as hereinafter specified.

In the drawings, A denotes the frame of the sewing mechanism, while B is the driving-shaft thereof. C is the curved hook-needle; D, the curved awl; E, the loop cast-off and needle-closer, and F the thread-guide.

Figure 10:
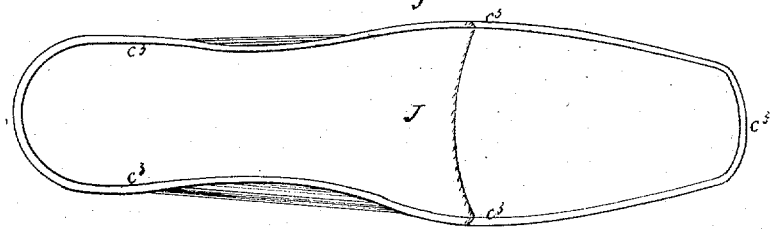

G is a guide-wheel made with a flange, *a*, and in form like a common railway-wheel, it being supported by a horizontal journal, *b*, held in position by a stationary arm, *c*. It is against the flange and the lower part of the periphery of the said guide-wheel that the sole and upper are borne while being sewed together. The said sole and upper-leather are to be arranged on a last, J, whose bottom is to be concave instead of being made convex, as in ordinary lasts, this form being necessary in order to enable the needle and awl to operate in a proper manner with respect to the edge of the sole and the upper. This concavity of the bottom extends longitudinally, as well as transversely, through the last. There is also another peculiarity in the construction of the said last—that is to say, the last entirely around the edge of the sole is chamfered or formed with a chamfer, as seen at $c^3$ in Fig. 3, and also in Fig. 10, which is a view of the sole of the last. This chamfer, with the concavity of the bottom, forms a ridge which imparts to the leather sole along or near its edge a bend which is highly favorable for the reception of the needle and the awl. This formation of the last with a hollow or concavity, and with the chamfer outside thereof, so as to form the ridge within or inside of the outer boundary of the last-bottom, is a feature of importance to the correct operation of the needle and awl. The said last is supported by a last-holder, I″, which at one or its heel end is hinged to its carrying-plate I, while its toe or other end is free to slide on a perforated pin, K, projecting from the said part I, as shown in the drawings. The said pin has a series of holes made transversely through it, as seen at *d*. By inclining the last-holder with respect to its plate I and passing a pin through that hole of the series *d* which is next to the last-holder and between it and the plate I, we are enabled to retain the last-holder in the assumed inclined position.

There is nothing specially new in the construction of the last-holder; but the edge or periphery of its carrying-plate has the form shown in the drawings, and is provided with teeth like a gear and engages with a pinion, K′, fixed on the inner end of a horizontal shaft, L, which is supported by an upright standard, M, whose lower end is hinged or jointed to a treadle-lever, N.

The carrying-plate I is made with a recess or chamber, *e*, the inner surface of whose edge is parallel to the periphery of the plate, and is supported on a roller, *f*, which in turn is sustained by and so as to be capable of freely revolving on a journal, *g*, extended from the standard M. A ratchet, O, is fixed on the outer end of the shaft L, and is actuated by a pawl, P, carried by a lever, Q, which has the shaft for its fulcrum, and is jointed to a rod, R, whose lower end is jointed to one arm of a lever, S, whose fulcrum projects from the middle of the lesser arm of the treadle-lever. A rod, I′, jointed to the other arm of the lever S, is carried upward and jointed to one arm of another lever, U, which is arranged within the frame A of the sewing-machine. The other arm of the lever U carries a roller, *h*, which, during the revolution of the shaft B, is struck by a cam, V, carried by such shaft. The said cam by its form serves to effect the proper feeding movement of the last, which, while the needle and awl are entering the sole and upper, is to be at rest.

From the above it will be seen that the feeding of the article to be sewed is not affected by a toothed or serrated roller placed near to the needle and awl, but is accomplished by mechanism arranged mostly on the treadle-lever and the upright standard, which supports the last-carrier supporting-plate I. The needle, as well as the awl, is curved in the arc of a circle, and they are respectively carried by two bent levers, W X, which are arranged side by side and play in vertical planes on one fulcrum-pin Y. The rearmost arms of these levers are connected to two arms, *i k*, (projecting from separate shafts, *l m*,) by connecting-rods *l′ m′*.

Figure 8:
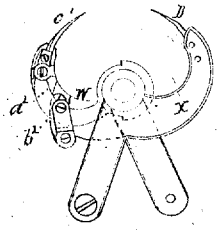
Figure 9:
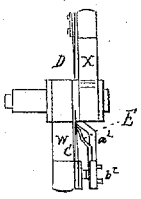

The loop cast-off and needle-closer E is carried by a curved arm, which turns with the levers W and X on the same center pin, Y. In other respects the said loop cast-off and needle-closer operates substantially as in other machines where it is employed in connection with a hooked needle. The loop cast-off and needle-closer and its arm $a^2$ are more particularly exhibited in Figs. 8 and 9, the former being a side view and the latter a front view of the loop cast-off and needle-closer, the needle, the awl, and their respective carrying-levers $b^2$, W, and X.

Each of the shafts *l m* has another shaft, *n* or *o*, extending from it and being operated by one of two cams, *p q*, fixed on the driving-shaft, the whole being constructed and arranged so as to impart to the needle and awl their necessary motions, in order to enable what is termed "chain-stitch sewing" to be effected with a waxed thread when passed through the thread-carrier Z.

As my invention has no reference to the usual mode of actuating the thread-carrier Z or the loop cast-off and needle-closer E, and as the operation of producing chain-stitch sewing by means of a waxed thread, a needle, an awl, a needle-closer, and a thread-carrier is well known, any further description thereof or of mechanism therefor would be irrelevant and unnecessary.

A small guide or supporting roller, *r*, is arranged below the wheel G and rests against the bottom of the sole or the ridge or crease usually made therein for reception of the needle, which, besides being curved, as described, is provided with a pointed extremity and a hook, as shown at *s*.

Fig. 6 denotes a front view, and Fig. 7 represents a side view, of the needle. In this needle the hook *s* has a peculiar arrangement with reference to the curve of the shank—that is to say, the hook is arranged so as to be on or mostly on or in the flank of the shank, and not on the intrados or extrados of the arc of the curve. This arrangement is specially useful in sewing, as it brings the flat side of the hook parallel, or about so, with the edge of the sole, and thus enables the needle to enter close to the said edge without tearing or otherwise injuring it. As the blade of the awl is always so arranged that while punching the sole it will make a hole elliptical, or approximately so, in transverse section, and as the longer axis of the section is parallel, or about so, with the edge of the sole, it will be seen that when the hook of the needle is not on the flank of the shank such hook is liable, during a retreat of the needle, to catch into and tear away the leather sole at its edge, as the hook in this case will pass through the hole crosswise of the transverse section thereof; but with my improved arrangement of the hook it retreats through the awl-hole lengthwise of its transverse section, and so as not to be liable to catch into and tear away the leather.

With my invention the sole and the upper are sewed together in very much the same manner in which they are usually connected by hand-sewing, except that the stitch differs from that usually made by the workman when using either one or two threads.

I do not claim, when separately considered, either a curved needle or a last made with a concave bottom; but

I claim—

1. The combination of the curved and hooked needle with the last constructed with a concave bottom, the whole being substantially as described and represented.

2. The arrangement of the hook on the flank of the curve of the shank of the needle, as described, and with respect to the awl, so as to puncture lengthwise instead of crosswise of its section a hole as made by the awl.

3. The combination of an awl curved longitudinally with a needle having its shank curved longitudinally, and provided with a hook near its point.

4. As an improvement, a sewing-machine, as constructed, not only with its needle curved and hooked, but with the same and the rest cast-off and needle-closer made to operate in curved paths having a common center or axis, as described.

5. The combination of the curved and hooked needle with the last constructed with a concave bottom and with a chamfer, or with their mechanical equivalents, so as to form a ridge around the said bottom and inside of its outer edge, as specified.

6. The combination of the last-holder with its carrying-plate in such manner as to enable the former to be inclined with respect to the latter, substantially in manner as set forth.

7. The above-described arrangement of the feeding mechanism with respect to the last-carrying plate-supporter M and the sewing mechanism.

8. A curved awl and a curved hook-needle arranged and combined with a guide-wheel, G, and a last having a concave bottom, the whole being in manner substantially as specified.

HENRY DUNHAM, JR.

Witnesses:

HENRY DUNHAM,
J. E. KEITH.